US010243353B2

United States Patent
Tsuyuki et al.

(10) Patent No.: US 10,243,353 B2
(45) Date of Patent: Mar. 26, 2019

(54) DC-DC CONVERTER

(71) Applicant: Fuji Electric Co., Ltd., Kanagawa (JP)

(72) Inventors: Masatoshi Tsuyuki, Tokyo (JP);
Ryohei Makino, Tokyo (JP);
Motoyoshi Kubouchi, Nagano (JP)

(73) Assignee: FUJI ELECTROC CO., LTD., Kanagawa (JP)

( * ) Notice: Subject to any disclaimer, the term of this patent is extended or adjusted under 35 U.S.C. 154(b) by 363 days.

(21) Appl. No.: 15/207,768

(22) Filed: Jul. 12, 2016

(65) Prior Publication Data

US 2017/0054288 A1 Feb. 23, 2017

(30) Foreign Application Priority Data

Aug. 19, 2015 (JP) .................................. 2015-161549
Nov. 20, 2015 (JP) .................................. 2015-227299

(51) Int. Cl.
*H02H 7/12* (2006.01)
*H02M 1/32* (2007.01)
*H02M 3/158* (2006.01)
*H02M 1/00* (2006.01)

(52) U.S. Cl.
CPC ............. *H02H 7/1213* (2013.01); *H02M 1/32* (2013.01); *H02M 3/158* (2013.01); *H02M 2001/009* (2013.01); *H02M 2001/325* (2013.01)

(58) Field of Classification Search
CPC ........ H02H 7/1213; H02M 1/32; H02M 3/07; H02M 3/142
See application file for complete search history.

(56) References Cited

U.S. PATENT DOCUMENTS

| 6,188,586 | B1* | 2/2001 | Farrington | ............ | H02M 3/337 |
| | | | | | 363/17 |
| 6,288,458 | B1* | 9/2001 | Berndt | .................... | H02M 3/07 |
| | | | | | 307/126 |
| 8,269,141 | B2* | 9/2012 | Daniel | .................... | B23K 9/09 |
| | | | | | 219/130.1 |
| 2006/0238941 | A1* | 10/2006 | Ingemi | .................... | H02J 9/062 |
| | | | | | 361/92 |

(Continued)

FOREIGN PATENT DOCUMENTS

JP 2013-38921 A 2/2013
WO WO 2015056340 A1 * 4/2015 .............. H02M 1/32

(Continued)

*Primary Examiner* — Ronald W Leja
*Assistant Examiner* — Christopher J Clark
(74) *Attorney, Agent, or Firm* — Chen Yoshimura LLP

(57) ABSTRACT

The DC-DC converter includes a series circuit of switching elements; a series circuit of capacitors; diodes respectively connected between one end of each of the series circuits; a series circuit constituted by a DC power source, a circuit breaker, and reactors; and a control circuit. The control circuit steps up a voltage of the DC power source through a chopper operation and causes the stepped up voltage to be outputted from both ends of the capacitor series circuit. When determining that a short circuit has occurred in one of the switching elements, the control circuit turns the other switching element that is free from the short circuit ON before the circuit breaker opens, thereby overriding and terminating the chopper operation and suppressing overvoltage caused by the short circuit.

16 Claims, 17 Drawing Sheets

(56) References Cited

U.S. PATENT DOCUMENTS

| | | | | |
|---|---|---|---|---|
| 2007/0257725 | A1* | 11/2007 | De | H03K 17/08128 |
| | | | | 327/379 |
| 2016/0241073 | A1* | 8/2016 | Hatakeyama | H02M 1/12 |
| 2016/0248352 | A1* | 8/2016 | Shinomoto | H02M 1/32 |
| 2016/0261205 | A1* | 9/2016 | Kolar | H02M 5/458 |
| 2016/0265822 | A1* | 9/2016 | Kamiya | H02M 7/062 |
| 2017/0244319 | A1* | 8/2017 | Makino | H02M 3/135 |
| 2018/0041106 | A1* | 2/2018 | Duman | H02M 3/33569 |
| 2018/0062557 | A1* | 3/2018 | Tao | H02M 1/32 |

FOREIGN PATENT DOCUMENTS

| | | | | |
|---|---|---|---|---|
| WO | WO 2015063869 A1 * | 5/2015 | | H02M 7/062 |
| WO | WO 2015079504 A1 * | 6/2015 | | H02M 1/12 |

* cited by examiner

[First Mode]

[Second Mode]

[Third Mode]

[Fourth Mode]

US 10,243,353 B2

DC-DC CONVERTER

BACKGROUND OF THE INVENTION

Technical Field

The present invention relates to a DC-DC converter including a boosting chopper circuit, and particularly relates to a DC-DC converter having a function for protection during short circuit faults occurring in a semiconductor switching element.

Background Art

FIG. 17 illustrates a boosting chopper circuit disclosed in Patent Document 1.

In FIG. 17, IN1 and IN2 represent positive and negative input terminals connected to a DC power source (not shown), OUT1 and OUT2 represent positive and negative output terminals, L1 represents a reactor, Q1 and Q2 represent transistors, D1 and D2 represent diodes, and C1 and C2 represent capacitors. Note that there are cases where in addition to the reactor L1, another reactor is inserted between the negative-side input terminal IN2 and an emitter of the transistor Q2.

An outline of operations according to this conventional technique will be given next.

By turning both the transistors Q1 and Q2 on, a current flows from the DC power source in a path of the input terminal IN1→reactor L1→transistors Q1 and Q2→input terminal IN2, and energy is accumulated in the reactor L1. Next, by turning the transistor Q2 off while keeping the transistor Q1 on, the DC power source and energy accumulated in the reactor L1 are supplied along a path of the transistor Q1→capacitor C2→diode D2→input terminal IN2, which charges the capacitor C2.

Next, by turning the transistor Q1 off and turning the transistor Q2 on, a current flows in a path of the input terminal IN1→reactor L1→diode D1→capacitor C1→transistor Q2→input terminal IN2, which charges the capacitor C1. In this state, when the transistor Q2 is turned off, the DC power source and the energy accumulated in the reactor L1 are supplied along a path of the diode D1→capacitor C1→capacitor C2→diode D2, which charges the capacitors C1 and C2.

By repeating the above-described operations, a voltage between the output terminals OUT1 and OUT2 is boosted to a higher voltage than the voltage of the DC power source. An output voltage of this boosting chopper circuit can take on three levels, namely a voltage at the capacitor C1, a voltage at the capacitor C2, and a sum of the voltages at the capacitors C1 and C2, and thus is also called a three-level boosting chopper circuit.

When configuring a DC-DC converter using such a boosting chopper circuit, a circuit breaker that cuts off the DC power source during circuit faults, a control circuit for controlling the transistors Q1 and Q2 and the circuit breaker, and the like, which are not illustrated here, are generally provided as well.

RELATED ART DOCUMENT

Patent Document

Patent Document 1: Japanese Patent Application Laid-Open Publication No. 2013-38921 (paragraphs [0021] to [0028], FIGS. 1 and 3, and so on)

SUMMARY OF THE INVENTION

In the three-level boosting chopper circuit illustrated in FIG. 17, the capacitors C1 and C2 are normally boosted in an alternating manner, but a short circuit fault occurring in one of the transistors Q1 and Q2 results in a circuit configuration where only one of these capacitors is boosted. There are thus cases where the one capacitor is boosted excessively and the voltage thereof exceeds a rated value.

In power converters such as DC-DC converters, when the occurrence of an abnormal voltage is detected, power conversion operations are stopped by turning all semiconductor switching elements (called simply switching elements hereinafter) off. Typically, at the same time, a circuit breaker is used to cut off the device from an input power source for protection.

However, in FIG. 17, in a fault mode such as where one of the transistors Q1 and Q2 short circuits, the one transistor will remain short circuited even if the other transistor is turned off. Accordingly, a path through which one of the capacitors is charged by the energy accumulated in the reactor L1 will remain until the device is actually separated from the DC power source by the circuit breaker. This results in a further rise in the voltage of the capacitor.

In a three-level boosting chopper circuit, an output voltage is distributed between the two capacitors C1 and C2 connected in series, which has an advantage in that only a voltage equivalent to about half of the output voltage will be applied to a single capacitor. Accordingly, low-breakdown voltage elements are normally used for switching elements such as the transistors Q1 and Q2. Low-breakdown voltage components are also normally used for the capacitors C1 and C2.

However, in the case where a short circuit fault mode such as that described above has occurred, there is a risk that the rise in the capacitor voltage will damage the low-breakdown voltage switching elements, the low-breakdown voltage capacitors, or the like.

Accordingly, a problem to be solved by the present invention is to provide a DC-DC power converter that enables a low-breakdown voltage switching element, a low-breakdown voltage capacitor, and the like to be used safely by suppressing a rise in a capacitor voltage when a short circuit fault has occurred in a switching element. The present invention is thus directed to a scheme that substantially obviates one or more of the problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in a first aspect (aspect 1), the present disclosure provides a DC-DC converter, including: a switching element series circuit in which first and second switching elements are connected in series and connected to respective ends of a DC power source; a reactor inserted between the DC power source and the switching element series circuit; a capacitor series circuit in which first and second capacitors are connected in series; first and second diodes, the first diode being connected between one end of the switching element series circuit and one end of the capacitor series circuit, the second diode being connected between the other end of the switching element series circuit and the other end of the capacitor series circuit; a control circuit that performs ON/OFF control of the first and second switching elements; and a detector that detects an anomaly in the switching element series circuit, wherein a node between the first and second switching elements is connected to a node between the first and second capacitors, wherein the control circuit turns the first and second switching elements ON and OFF via a chopper operation so as to step up a voltage of the DC power source and cause the stepped up voltage to be outputted from both ends of the capacitor series circuit, and wherein the control circuit determines that a short circuit has occurred in the switching element series circuit when the detector detects the anomaly, and when that determination is made, the control circuit transmits an overriding ON command to one of the first and second switching elements that is determined to be free from the short circuit if such determination is made, or to both of the first and second switching elements regardless of whether such determination is made, thereby overriding and terminating the chopper operation.

An invention according to aspect 2 is the DC-DC converter according to aspect 1, further including:

a circuit breaker between the DC power source and the switching element series circuit, wherein, when the detector detects the short circuit in the switching element series circuit, the control circuit transmits an open command to the circuit breaker when transmitting the overriding ON command, and wherein the circuit breaker opens in response to the open command after the corresponding first and/or second switching element has turned on in response to the overriding ON command.

An invention according to aspect 3 is the DC-DC converter according to aspect 1, wherein the detector includes first and second voltage detectors that detect voltages across the first and second capacitors, respectively, and wherein the control circuit determines that the short circuit has occurred in the second switching element when the detector detects an overvoltage across the first capacitor, and determines that the short circuit has occurred in the first switching element when the detector detects an overvoltage across the second capacitor.

An invention according to aspect 4 is the DC-DC converter according to aspect 1, wherein the detector includes first and second voltage detectors that detect voltages across the first and second capacitors, respectively, wherein the detector determines that the short circuit has occurred in the second switching element when the detector detects that a voltage across the first capacitor is higher than a voltage across the second capacitor and that a deviation of greater than or equal to a prescribed value has arisen between the voltages of the two capacitors, and wherein the control circuit determines that the short circuit has occurred in the first switching element when the detector detects that a voltage across the second capacitor is higher than a voltage across the first capacitor and that a deviation of greater than or equal to a prescribed value has arisen between the voltages of the two capacitors.

An invention according to aspect 5 is the DC-DC converter according to aspect 1, wherein the detector includes first and second current detectors that detect currents in the first and second switching elements, respectively, and wherein the control circuit determines that the short circuit has occurred in the first switching element when the detector detects that an overcurrent is flowing in the first switching element, and determines that the short circuit has occurred in the second switching element when the detector detects that an overcurrent is flowing in the second switching element.

An invention according to aspect 6 is the DC-DC converter according to aspect 1, wherein the detector includes first and second voltage detectors that detect voltages across the first and second switching elements, respectively, wherein the control circuit determines that the short circuit has occurred in the first switching element when the detector detects that a voltage between both ends of the first switching element is greater than or equal to a prescribed value or less than or equal to a prescribed value in a period in the chopper operation during which an ON command is being supplied to the first switching element, and wherein the control circuit determines that the short circuit has occurred in the second switching element when the detector detects that a voltage between both ends of the second switching element is greater than or equal to a prescribed value or less than or equal to a prescribed value in a period in the chopper operation during which an ON command is being supplied to the second switching element.

An invention according to aspect 7 is the DC-DC converter according to aspect 1, wherein the detector includes first and second voltage detectors that detect voltages across the first and second switching elements, respectively, wherein the control circuit determines that the short circuit has occurred in the first switching element when the detector detects that a voltage between both ends of the first switching element is less than or equal to a prescribed value in a period in the chopper operation during which an OFF command is being supplied to the first switching element, and wherein the control circuit determines that the short circuit has occurred in the second switching element when the detector detects that a voltage between both ends of the second switching element is less than or equal to a prescribed value in a period in the chopper operation during which an OFF command is being supplied to the second switching element.

An invention according to aspect 8 is the DC-DC converter according to aspect 1, wherein the detector includes first and second current detectors that detect currents in the first and second diodes, respectively, and wherein the control circuit determines that the short circuit has occurred in the second switching element when the detector detects that an overcurrent is flowing in the first diode, and determines that the short circuit has occurred in the first switching element when the detector detects that an overcurrent is flowing in the second diode.

An invention according to aspect 9 is the DC-DC converter according to aspect 1, wherein the detector includes first and second voltage detectors that detect voltages across the first and second diodes, respectively, wherein the control circuit determines that the short circuit has occurred in the second switching element when the detector detects that a voltage between both ends of the first diode is greater than or equal to a prescribed value in a period in the chopper operation during which an OFF command is being supplied to the first switching element, and wherein the control circuit determines that the short circuit has occurred in the first switching element when the detector detects that a voltage between both ends of the second diode is greater than or equal to a prescribed value in a period in the chopper operation during which an OFF command is being supplied to the second switching element.

An invention according to aspect 10 is the DC-DC converter according to aspect 1, wherein the detector is a current detector that detects a current in the reactor, and wherein the control circuit determines that the short circuit has occurred in at least one of the first and second switching elements when the current detector detects that an overcurrent is flowing in the reactor.

An invention according to aspect 11 is the DC-DC converter according to aspect 1, wherein the detector is a voltage detector that detects a voltage across the reactor, and wherein the control circuit determines that the short circuit has occurred in at least one of the first and second switching elements when the voltage detector detects that a voltage between both ends of the reactor is greater than or equal to a prescribed value.

An invention according to aspect 12 is the DC-DC converter according to aspect 1, wherein the detector is a current detector that detects a current in a line connecting the node between the first and second switching elements to the node between the first and second capacitors, and wherein the control circuit determines that the short circuit has occurred in at least one of the first and second switching elements when the current detector detects that an overcurrent is flowing in the line.

An invention according to aspect 13 is the DC-DC converter according to aspect 1, wherein the control circuit determines that the short circuit has occurred in the first switching element when the detector detects that a control electrode of the first switching element is continually short circuited or that a potential of the control electrode is continually at a high level, and wherein the control circuit determines that the short circuit has occurred in the second switching element when the detector detects that a control electrode of the second switching element is continually short circuited or that a potential of the control electrode is continually at a high level.

An invention according to aspect 14 is the DC-DC converter according to aspect 1, wherein the control circuit determines that the short circuit has occurred in the first switching element when the detector detects that a current flowing in a control electrode of the first switching element is an overcurrent or is continually flowing, and wherein the control circuit determines that the short circuit has occurred in the second switching element when the detector detects that a current flowing in a control electrode of the second switching element is an overcurrent or is continually flowing.

An invention according to aspect 15 is the DC-DC converter according to aspect 1, wherein the detector includes first and second current detectors that detect currents in the first and second capacitors, respectively, wherein the control circuit determines that the short circuit has occurred in the second switching element when the detector detects that an overcurrent is flowing in the first capacitor, and determines that the short circuit has occurred in the first switching element when the detector detects that an overcurrent is flowing in the second capacitor.

An invention according to aspect 16 is the DC-DC converter according to aspect 1, wherein the control circuit outputs a warning when determining that the short circuit has occurred in the switching element series circuit.

According to the present invention, in the case where a short circuit fault has occurred in one switching element, a current path flowing through a capacitor can be eliminated by fixing the other normal switching element in an on state before opening a circuit breaker. Through this, a capacitor voltage is suppressed from continuing to rise, and thus even in the case where a low-breakdown voltage switching element, a low-breakdown voltage capacitor, or the like is used, those elements can be prevented from being damaged.

It is to be understood that both the foregoing general description and the following detailed description are exemplary and explanatory, and are intended to provide further explanation of the invention as claimed.

DETAILED DESCRIPTION OF EMBODIMENTS

Embodiment 1 of the present invention will be described hereinafter with reference to the drawings.

Figure 1:
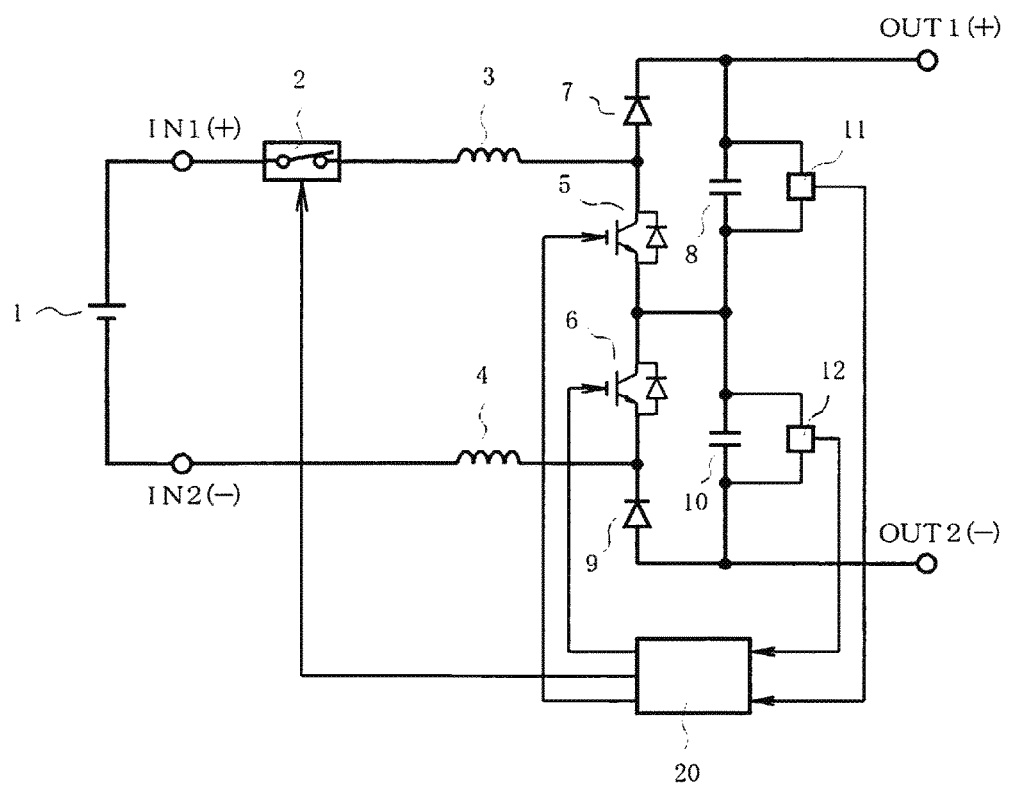
FIG. 1 is a diagram illustrating Embodiment 1 of the present invention.

FIG. 1 is a schematic diagram illustrating a DC-DC converter according to Embodiment 1, and corresponds to aspects 1 to 4. In FIG. 1, a positive pole of a DC power source 1 is connected to one end of a circuit breaker 2 via an input terminal IN1, and another end of the circuit breaker 2 is connected to one end of a reactor 3. Another end of the reactor 3 is connected to a node between a switching element 5 and a diode 7.

Meanwhile, a negative pole of the DC power source 1 is connected to one end of a reactor 4 via an input terminal IN2, and another end of the reactor 4 is connected to a node between a switching element 6 and a diode 9.

The switching elements 5 and 6 are connected in series; a capacitor 8 is connected between that series node and a cathode of the diode 7, whereas a capacitor 10 is connected between the series node and an anode of the diode 9. In other words, the capacitors 8 and 10 are also connected in series, and positive and negative output terminals OUT1 and OUT2 are respectively connected to ends of that capacitor series circuit.

Furthermore, voltage detectors 11 and 12 are connected to both ends of the capacitors 8 and 10, respectively, and output signals (voltage detection values) thereof are inputted to a control circuit 20. The control circuit 20 is configured to generate on/off signals for the switching elements 5 and 6 on the basis of the voltage detection values from the capacitors 8 and 10 and generate open/close instructions (an open (break) command/a close command) for the circuit breaker 2.

In the above-described configuration, the switching elements 5 and 6 respectively correspond to first and second switching elements according to the aspects, the diodes 7 and 9 respectively correspond to first and second diodes, the capacitors 8 and 10 respectively correspond to first and second capacitors, and the voltage detectors 11 and 12 respectively correspond to first and second voltage detectors.

Although IGBTs are used for the switching elements 5 and 6 in FIG. 1, it goes without saying that power transistors, FETs, or the like may be used instead. Specifically, elements using wide band gap semiconductors, such as SiC (silicon carbide), GaN (gallium nitride), or the like, may be employed, and a three-level boosting chopper circuit having a higher efficiency and a smaller size can be configured by employing such elements. Meanwhile, it is sufficient for at least one of the reactors 3 and 4 to be provided.

Figure 17:
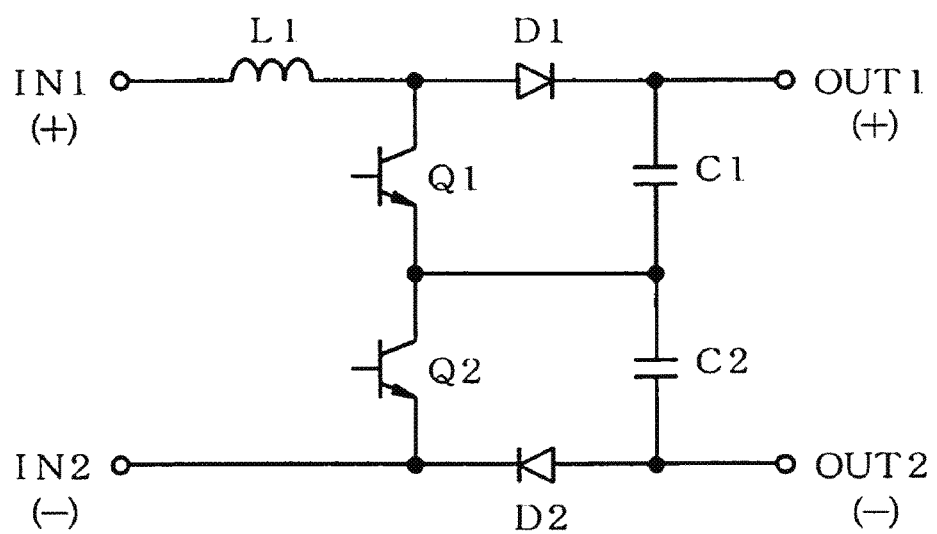
FIG. 17 is a circuit diagram illustrating a conventional technique disclosed in Patent Document 1.

Note that a circuit substantially the same as the three-level boosting chopper circuit illustrated in FIG. 17 is configured by removing the circuit breaker 2, the voltage detectors 11 and 12, the control circuit 20, and so on from the circuit illustrated in FIG. 1.

Operations according to this embodiment will be described hereinafter with reference to FIGS. 2 to 6.

The DC-DC converter illustrated in FIG. 1 controls the switching elements 5 and 6 to turn on and off using the control circuit 20, and boosts the capacitors 8 and 10 by sequentially executing similar operating modes as in the conventional technique illustrated in FIG. 17 (first to fourth modes described hereinafter).

Figure 2:
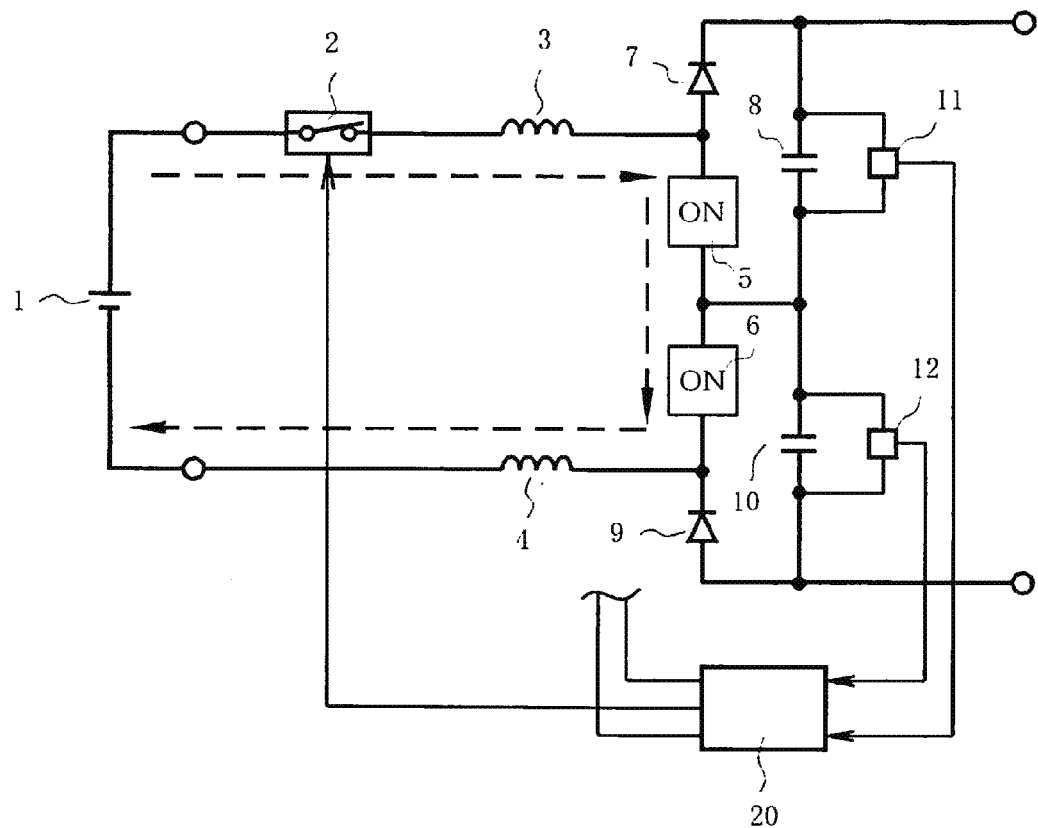
FIG. 2 is a diagram illustrating operations in a first mode according to Embodiment 1 of the present invention.

(1) First Mode (FIG. 2)

This is a state in which both the switching elements 5 and 6 are on. In this state, a current flows in a path of the DC power source 1→circuit breaker 2→reactor 3→switching element 5→switching element 6→reactor 4→DC power source 1, and energy is accumulated in the reactors 3 and 4.

Figure 3:
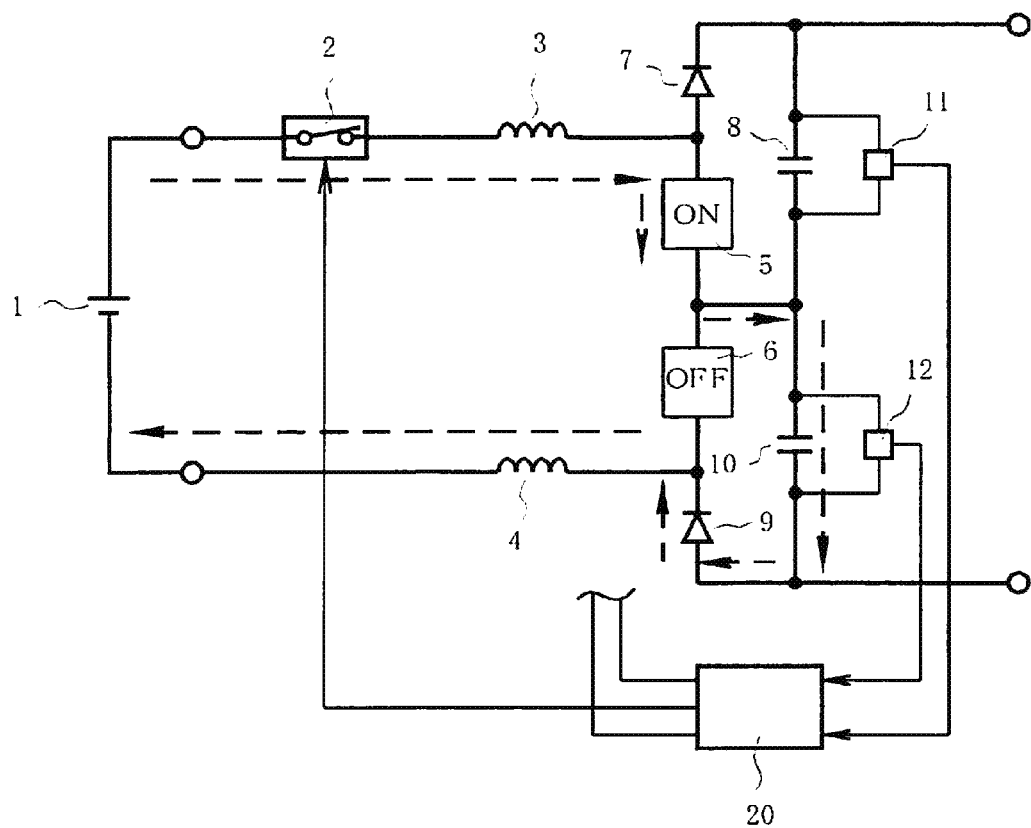
FIG. 3 is a diagram illustrating operations in a second mode according to Embodiment 1 of the present invention.

(2) Second Mode (FIG. 3)

This is a state in which the switching element 5 continues to be on, but the switching element 6 is off. In this state, a current flows in a path of the DC power source 1→circuit breaker 2→reactor 3→switching element 5→capacitor 10→diode 9→reactor 4→DC power source 1, and the capacitor 10 is charged with the energy accumulated in the reactors 3 and 4.

Figure 4:
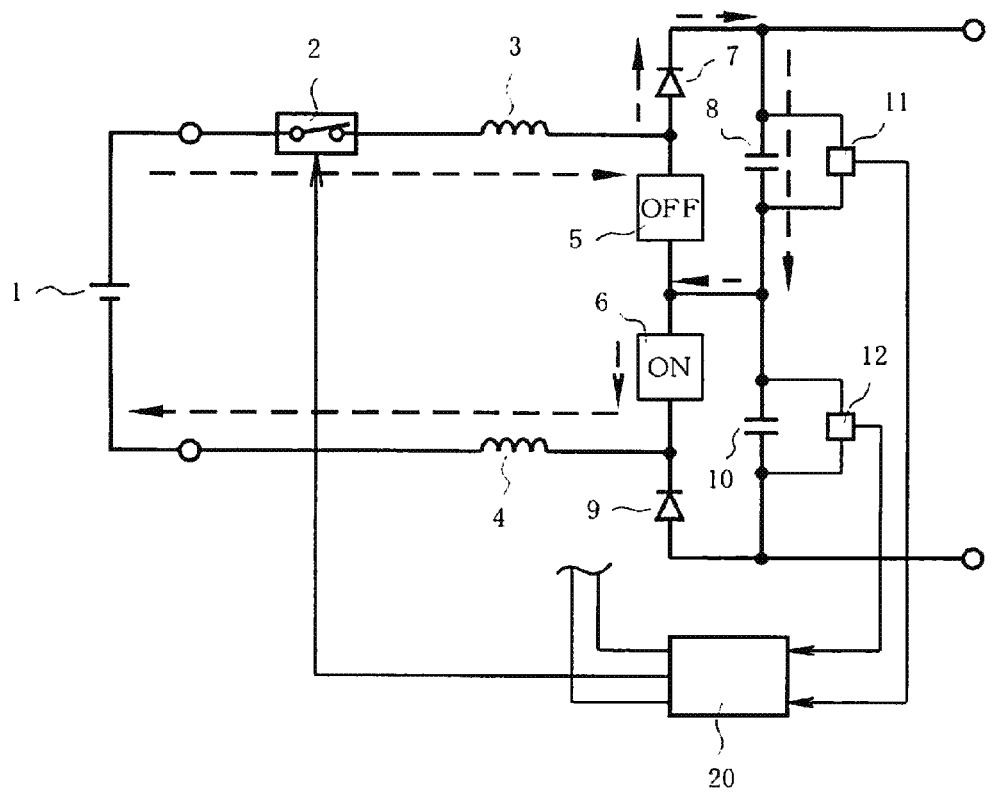
FIG. 4 is a diagram illustrating operations in a third mode according to Embodiment 1 of the present invention.

(3) Third Mode (FIG. 4)

This is a state in which, opposite from the second mode, the switching element 5 is off but the switching element 6 is on. In this state, a current flows in a path of the DC power source 1→circuit breaker 2→reactor 3→diode 7→capacitor 8→switching element 6→reactor 4→DC power source 1, and the capacitor 8 is charged with the energy accumulated in the reactors 3 and 4.

Figure 5:
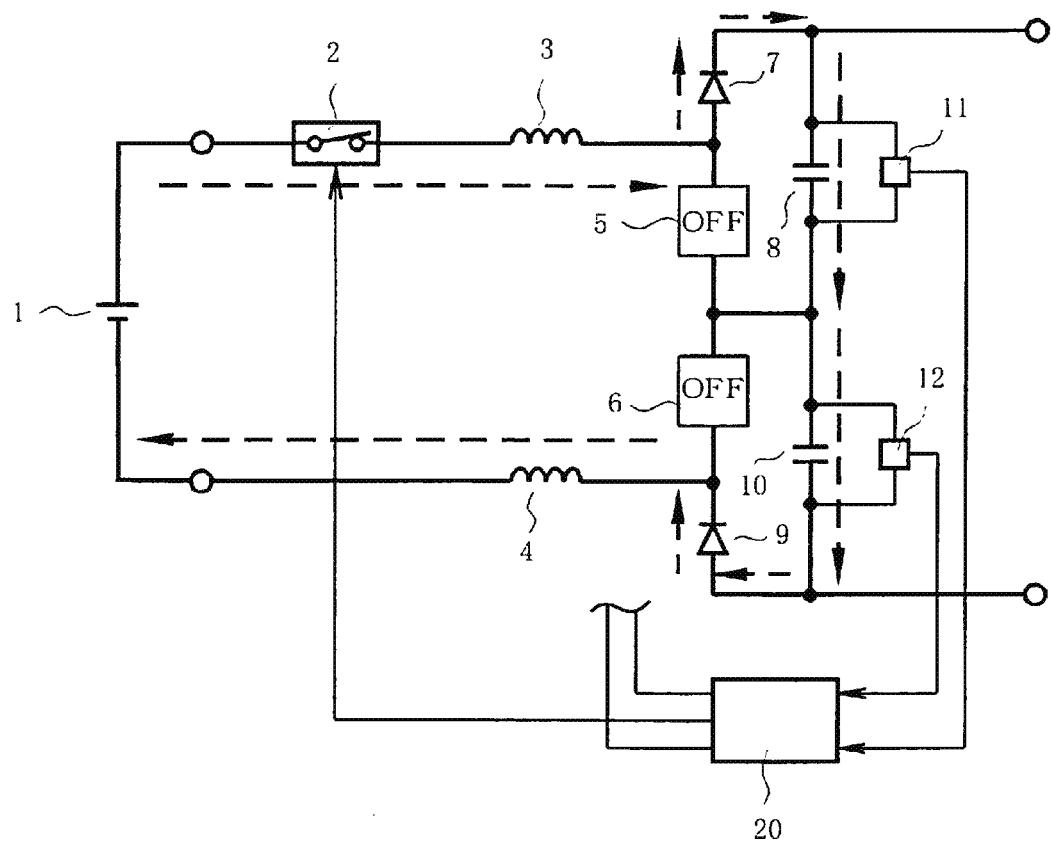
FIG. 5 is a diagram illustrating operations in a fourth mode according to Embodiment 1 of the present invention.

(4) Fourth Mode (FIG. 5)

This is a state in which both the switching elements 5 and 6 are off. In this state, a current flows in a path of the DC power source 1→circuit breaker 2→reactor 3→diode 7→capacitor 8→capacitor 10→diode 9→reactor 4→DC power source 1, and the capacitors 8 and 10 are charged by the DC power source 1 and with the energy accumulated in the reactors 3 and 4.

In this manner, the capacitors 8 and 10 are boosted while being charged repeatedly, and stabilize at a constant voltage in accordance with an on/off ratio of the switching elements 5 and 6.

Next, operations carried out in the case where a short circuit fault has occurred in one of the switching elements 5 and 6 (here, the switching element 6) will be described.

Figure 6A:
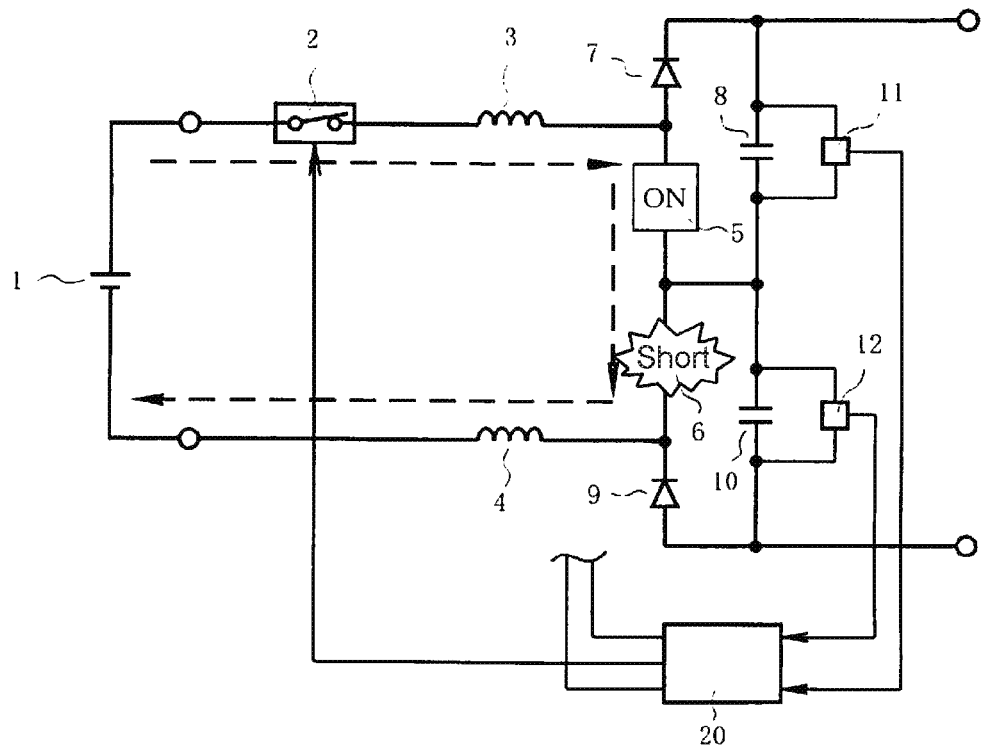
FIGS. 6A and 6B are diagrams illustrating operations carried out when a short circuit fault has occurred according to Embodiment 1 of the present invention.
Figure 6B:
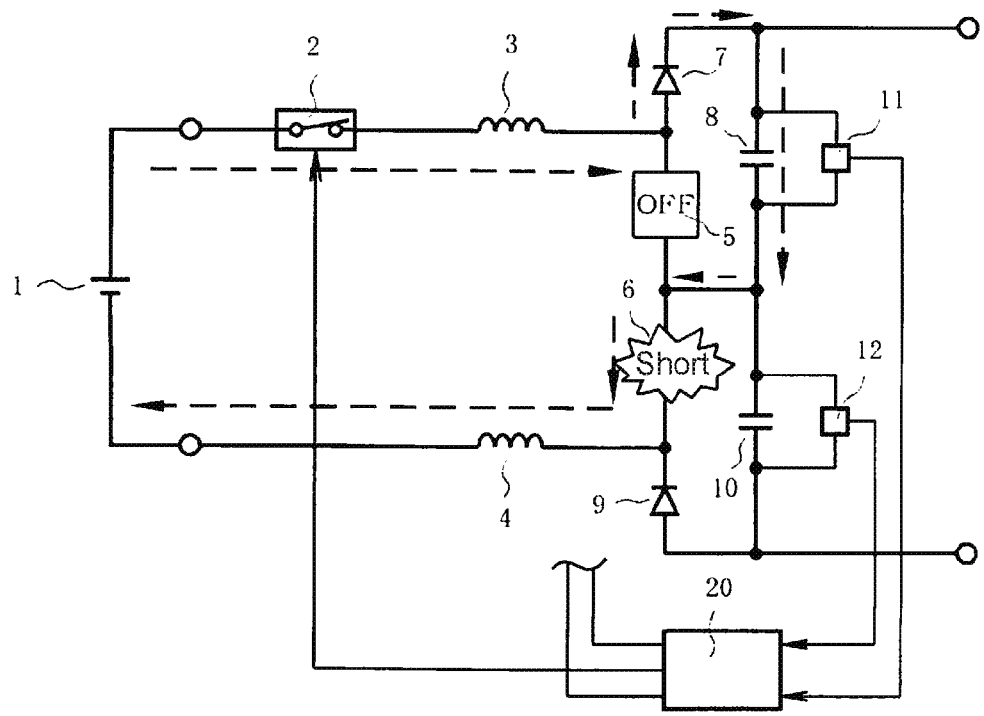

Assuming that a short circuit fault has occurred in the switching element 6 but the other switching element 5 is functioning normally, conduction operations through the paths illustrated in FIGS. 6A and 6B are repeated in an alternating manner in accordance with the switching element 5 being on/off.

In other words, in FIG. 6A, in which the switching element 5 is on, a current flows in a path of the DC power source 1→circuit breaker 2→reactor 3→switching element 5→switching element 6 (short circuited)→reactor 4→DC power source 1, and energy is accumulated in the reactors 3 and 4.

Meanwhile, in FIG. 6B, in which the switching element 5 is off, a current flows in a path of the DC power source 1→circuit breaker 2→reactor 3→diode 7→capacitor 8→switching element 6 (short circuited)→reactor 4→DC power source 1, due to the energy accumulated in the reactors 3 and 4 and the power of the DC power source 1.

Repeating the operations described above with reference to FIGS. 6A and 6B results in boosting chopper operations being carried out for the capacitor 8 only. Accordingly, all of the energy in the reactors 3 and 4, which is distributed between the two capacitors 8 and 10 through the normal operations in the first to fourth mode when the switching elements 5 and 6 function normally, is supplied to the one capacitor 8. The voltage of the capacitor 8 rises to a value that is higher than normal as a result.

The voltage of the capacitor 8 is detected by the voltage detector 11 and a resulting voltage detection value is inputted to the control circuit 20, and thus the control circuit 20 detects that an overvoltage is being applied to the capacitor 8.

Meanwhile, the voltages of the capacitors 8 and 10 are detected by the voltage detectors 11 and 12, and the resulting voltage detection values are inputted to the control circuit 20. The control circuit 20 detects that the voltage of the capacitor 8 is higher than the voltage of the capacitor 10 and that there is a deviation greater than or equal to a prescribed value between the voltage values of the two capacitors.

The control circuit 20 determines that a short circuit fault has occurred in the switching element 6 in the case where it has been detected that an overvoltage is being applied to the capacitor 8, or in the case where it has been detected that the voltage of the capacitor 8 is higher than the voltage of the capacitor 10 and a deviation greater than or equal to a prescribed value has arisen between the voltage values of the capacitors 8 and 10.

In the case where it is determined that a short circuit fault has occurred in the switching element 6, the control circuit 20 outputs a signal for opening the circuit breaker 2 as a protective operation. However, there is a slight time delay until the circuit breaker 2 is actually opened, and thus there is a risk that the boosting operations for the capacitor 8 will continue. Accordingly, the control circuit 20 turns on the switching element 5 via an overriding ON command at the point in time when it is determined a short circuit fault has occurred in the switching element 6, or in other words, before the circuit breaker 2 is actually opened.

This fixes the operations of the device to the mode illustrated in FIG. 6A until the DC power source 1 is completely cut off from the device, which makes it possible to prevent the voltage of the capacitor 8 from continuing to rise.

The above example describes a case where a short circuit fault has occurred in the switching element 6, but in the case where a short circuit fault has occurred in the switching element 5, an overvoltage is applied to the capacitor 10 as a result of the on/off operations of the switching element 6 being repeated. Furthermore, as a result of the on/off operations of the switching element 6 being repeated, the voltage of the capacitor 10 is higher than the voltage of the capacitor 8 and a deviation greater than or equal to a prescribed value arises between the voltage values of the two capacitors.

Accordingly, the voltage of the capacitor 10 can be prevented from continuing to rise by the control circuit 20 turning the switching element 6 on before the circuit breaker 2 is actually opened, on the basis of the voltage detection values from the voltage detectors 11 and 12.

In the case where it is determined that a short circuit fault has occurred in the switching element 5 or the switching element 6, the control circuit 20 may supply an on gate command to both the switching elements 5 and 6, and the same effects can be achieved in such a case as well.

According to Embodiment 1, the control circuit 20 determines that a short circuit fault has occurred in the switching element 6 upon determining that an overvoltage is applied to the capacitor 8. Likewise, the control circuit 20 determines that a short circuit fault has occurred in the switching element 5 upon determining that an overvoltage is applied to the capacitor 10.

In addition, the control circuit 20 determines that a short circuit fault has occurred in the switching element 6 when the voltage of the capacitor 8 is higher than the voltage of the capacitor 10 and a deviation greater than or equal to a prescribed value has arisen between the voltage values of the two capacitors 8 and 10. Likewise, the control circuit 20 determines that the switching element 5 when the voltage of the capacitor 10 is higher than the voltage of the capacitor 8 and a deviation greater than or equal to a prescribed value has arisen between the voltage values of the two capacitors 8 and 10.

Accordingly, in the case where the above-described short circuit faults are determined to have occurred, it is desirable that the control circuit 20 issue a warning in an appropriate form along with carrying out the protective operation for opening the circuit breaker 2 so as to prompt maintenance/checkup operations, including replacing the switching elements.

Figure 7:
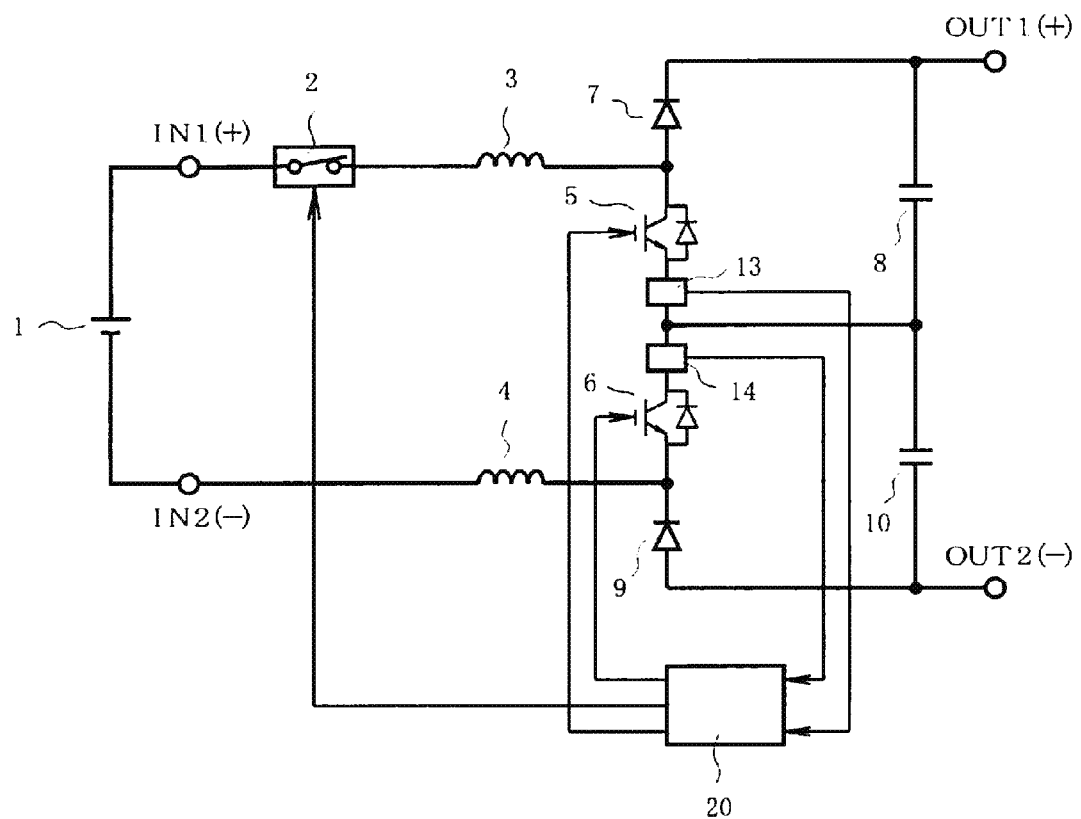
FIG. 7 is a diagram illustrating Embodiment 2 of the present invention.

Next, Embodiment 2 of the present invention, corresponding to aspect 5, will be described with reference to FIG. 7.

In Embodiment 2, current detectors 13 and 14 are connected in series to the switching elements 5 and 6, respectively, and current detection values outputted from the current detectors 13 and 14 are inputted to the control circuit 20. The control circuit 20 is configured to generate on/off signals for the switching elements 5 and 6 on the basis of the current detection values of the switching elements 5 and 6 and generate open/close commands for the circuit breaker 2.

Here, conduction operations such as those described in Embodiment 1 with reference to FIGS. 6A and 6B are repeated in the case where a short circuit fault has occurred in one of the switching elements 5 and 6 (here, the switching element 6). As a result, a current flowing in the switching element 6 gradually increases, and a current much greater than that flowing during normal operations, or in other words, an overcurrent, flows.

In the present embodiment, the current flowing in the switching element 6 is detected by the current detector 13, and the resulting current detection value is inputted to the control circuit 20; accordingly, the control circuit 20 detects that an overcurrent is flowing in the switching element 6. The control circuit 20 therefore determines that a short circuit fault has occurred in the switching element 6 in the case where it has been detected that an overcurrent is flowing in the switching element 6.

Having determined that a short circuit fault has occurred in the switching element 6, the control circuit 20 prevents the voltage of the capacitor 8 from continuing to rise by turning the switching element 5 on before the circuit breaker 2 is opened.

The above example describes a case where a short circuit fault has occurred in the switching element 6, but in the case where a short circuit fault has occurred in the switching element 5, an overcurrent flows in the switching element 5 as a result of the on/off operations of the switching element 6 being repeated.

Accordingly, the voltage of the capacitor 10 can be prevented from continuing to rise by the control circuit 20 turning the switching element 6 on before the circuit breaker 2 is opened, on the basis of the current detection value from the current detector 14.

In the case where it is determined that the switching element 5 or a short circuit fault has occurred in the switching element 6, the control circuit 20 may supply an on gate command to both the switching elements 5 and 6, and the same effects can be achieved in such a case as well.

Figure 8:
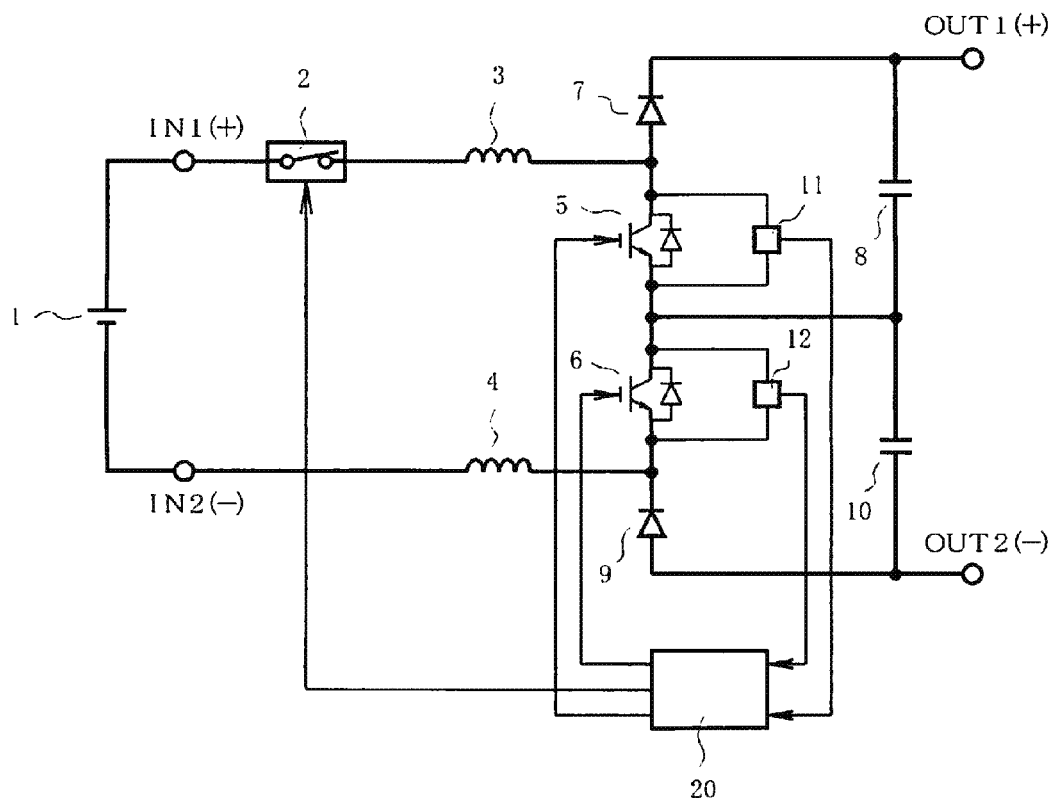
FIG. 8 is a diagram illustrating Embodiment 3 of the present invention.

Next, Embodiment 3 of the present invention, corresponding to aspects 6 and 7, will be described with reference to FIG. 8.

In Embodiment 3, voltage detectors 11 and 12 are connected to both ends of the switching elements 5 and 6, respectively, and voltage detection values outputted from the voltage detectors 11 and 12 are inputted to the control circuit

20. The control circuit 20 is configured to generate on/off signals for the switching elements 5 and 6 on the basis of the voltage detection values of the switching elements 5 and 6 and generate open/close commands for the circuit breaker 2.

Here, as one situation, when a short circuit fault has occurred in one of the switching elements 5 and 6 (here, the switching element 6), there are cases where a voltage between both ends of the switching element 6 is much lower than a voltage in an on period during normal operations. This is because an internal resistance of the switching element 6 becomes much lower than a normal state as a result of a channel serving as a main current path within the switching element 6 having shorted.

As another situation, there are cases where the voltage between both ends of the switching element 6 is much higher than the voltage in the on period during normal operations. This is caused by the gate of the switching element 6 faulting and the switching element 6 becoming unable to transition to an off state. In this case, the conduction operations described using FIGS. 6A and 6B are repeated, and thus the current flowing in the switching element 6 increases gradually. As a result, the element voltage becomes much higher in a period where a gate command to the switching element 6 is on than during normal conduction in the on period during normal operations.

Meanwhile, in both of the aforementioned situations, the switching element 6 cannot transition to a correct off state during a period where the gate command to the switching element 6 is off. Accordingly, even if the gate command is off, the voltage between both ends of the switching element 6 will be a much lower voltage than the voltage in the off period during normal operations.

Accordingly, in the present embodiment, the control circuit 20 determines that a short circuit fault has occurred in the switching element 6 in the case where the voltage between both ends of the switching element 6 during the period when the gate command to the switching element 6 is on has been detected as being much higher or much lower than the voltage in the on period during normal operations.

Alternatively, it is determined that a short circuit fault has occurred in the switching element 6 in the case where the voltage between both ends of the switching element 6 during the period when the gate command to the switching element 6 is off has been detected as being much lower than the voltage in the off period during normal operations.

Having determined that a short circuit fault has occurred in the switching element 6, the control circuit 20 prevents the voltage of the capacitor 8 from continuing to rise by turning the switching element 5 on before the circuit breaker 2 is opened.

Although the above describes a case where a short circuit fault has occurred in the switching element 6 as an example, the same assumption is made in the case where a short circuit fault has occurred in the switching element 5 as well. Having determined that a short circuit fault has occurred in the switching element 5, the control circuit 20 prevents the voltage of the capacitor 10 from continuing to rise by turning the switching element 6 on before the circuit breaker 2 is opened.

Meanwhile, in the case where it is determined that the switching element 5 or a short circuit fault has occurred in the switching element 6, the control circuit 20 may supply an on gate command to both the switching elements 5 and 6, and the same effects can be achieved in such a case as well.

Figure 9:
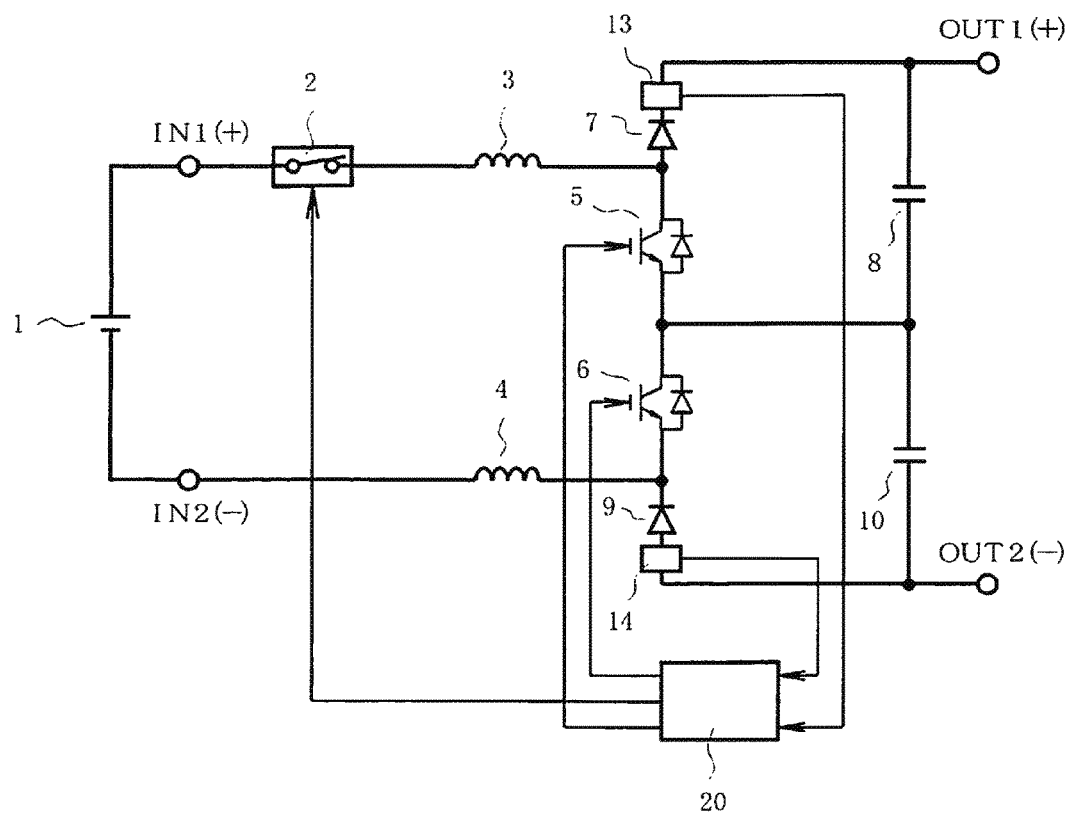
FIG. 9 is a diagram illustrating Embodiment 4 of the present invention.

Next, Embodiment 4 of the present invention, corresponding to aspect 8, will be described with reference to FIG. 9.

In Embodiment 4, the current detectors 13 and 14 are connected in series to the diodes 7 and 9, respectively, and the current detection values outputted from the current detectors 13 and 14 are inputted to the control circuit 20. The control circuit 20 is configured to generate on/off signals for the switching elements 5 and 6 on the basis of the current detection values of the diodes 7 and 9 and generate open/close commands for the circuit breaker 2.

Here, a case where a short circuit fault has occurred in one of the switching elements 5 and 6 (here, the switching element 6) will be described. In this case, the conduction operations described in Embodiment 1 with reference to FIGS. 6A and 6B are repeated. As a result, a current flowing in the diode 7 gradually increases, and a current much greater than that flowing during normal operations, or in other words, an overcurrent, flows.

In the present embodiment, the control circuit 20 detects that an overcurrent is flowing in the diode 7 on the basis of the current detection value of the diode 7.

The control circuit 20 determines that a short circuit fault has occurred in the switching element 6 in the case where it has been detected that an overcurrent is flowing in the diode 7.

Having determined that a short circuit fault has occurred in the switching element 6, the control circuit 20 prevents the voltage of the capacitor 8 from continuing to rise by turning the switching element 5 on before the circuit breaker 2 is opened.

In the case where a short circuit fault has occurred in the switching element 5, an overcurrent flows in the diode 9 as a result of the on/off operations of the switching element 6 being repeated. The control circuit 20 detects that an overcurrent is flowing in the diode 9 on the basis of the current detection value of the diode 9.

The control circuit 20 determines that a short circuit fault has occurred in the switching element 5 in the case where it has been detected that an overcurrent is flowing in the diode 9.

Having determined that a short circuit fault has occurred in the switching element 5, the control circuit 20 prevents the voltage of the capacitor 10 from continuing to rise by turning the switching element 6 on before the circuit breaker 2 is opened.

Note that in the case where it is determined that the switching element 5 or a short circuit fault has occurred in the switching element 6, the control circuit 20 may supply an on gate command to both the switching elements 5 and 6, and the same effects can be achieved in such a case as well.

Figure 10:
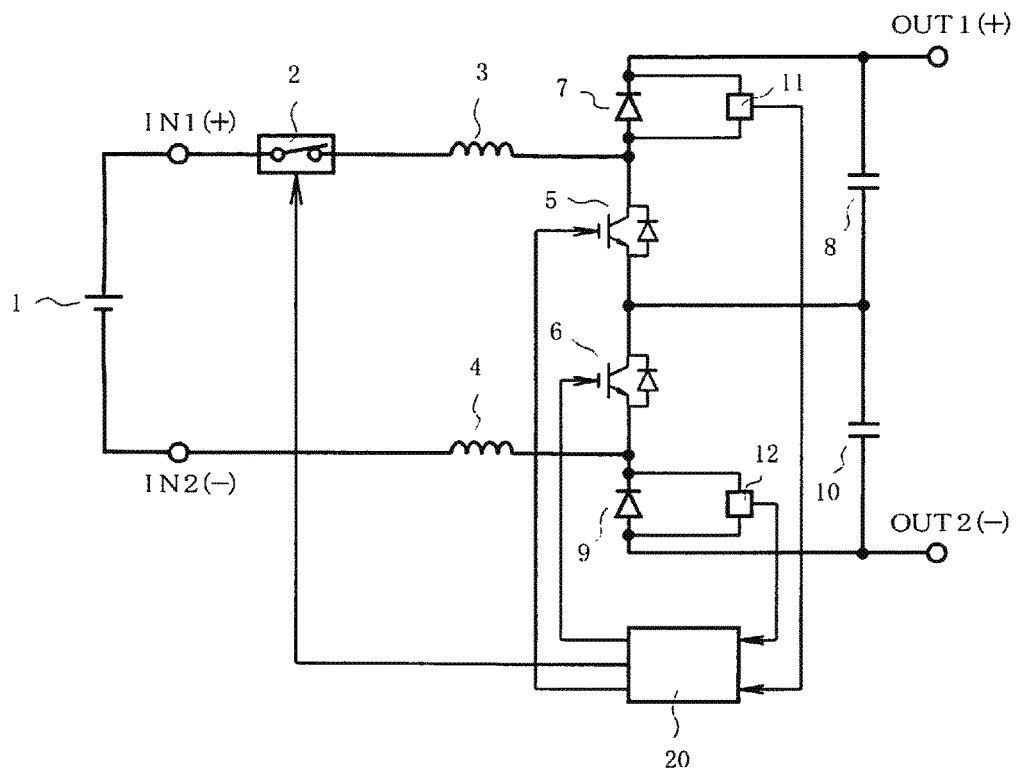
FIG. 10 is a diagram illustrating Embodiment 5 of the present invention.

Next, Embodiment 5 of the present invention, corresponding to aspect 9, will be described with reference to FIG. 10.

In Embodiment 5, the voltage detectors 11 and 12 are connected to both ends of the diodes 7 and 9, respectively, and voltage detection values outputted from the voltage detectors 11 and 12 are inputted to the control circuit 20. The control circuit 20 is configured to generate on/off signals for the switching elements 5 and 6 on the basis of the voltage detection values of the diodes 7 and 9 and generate open/close commands for the circuit breaker 2.

Here, a case where a short circuit fault has occurred in one of the switching elements 5 and 6 (here, the switching element 6) will be described. In this case, the conduction operations described in Embodiment 1 with reference to FIGS. 6A and 6B are repeated. As a result, a current flowing in the diode 7 gradually increases, and a current much greater than that flowing during normal operations, or in other words, an overcurrent, flows.

Accordingly, the voltage at the diode 7 is much higher than the voltage in a diode on period (a period in which the gate command to the switching element 5 is off) during normal operations. Here, the voltage of the diode 7 behaves according to forward current-voltage characteristics.

In the present embodiment, the control circuit 20 detects that an overcurrent is flowing in the diode 7 in the case where the voltage between both ends of the diode 7 in a period where the gate command to the switching element 5 is off is detected as being much greater than the voltage in that period during normal operations.

The control circuit 20 determines that a short circuit fault has occurred in the switching element 6 in the case where it has been detected that an overcurrent is flowing in the diode 7.

Having determined that a short circuit fault has occurred in the switching element 6, the control circuit 20 prevents the voltage of the capacitor 8 from continuing to rise by turning the switching element 5 on before the circuit breaker 2 is opened.

In the case where a short circuit fault has occurred in the switching element 5, an overcurrent flows in the diode 9 as a result of the on/off operations of the switching element 6 being repeated. Accordingly, the voltage at the diode 9 is much higher than the voltage in a diode on period (a period in which the gate command to the switching element 6 is off) during normal operations.

The control circuit 20 determines that a short circuit fault has occurred in the switching element 6 in the case where it has been detected that an overcurrent is flowing in the diode 9. The control circuit 20 prevents the voltage of the capacitor 10 from continuing to rise by turning the switching element 6 on before the circuit breaker 2 is opened.

Here, in the case where it is determined that the switching element 5 or a short circuit fault has occurred in the switching element 6, the control circuit 20 may supply an on gate command to both the switching elements 5 and 6, and the same effects can be achieved in such a case as well.

Figure 11:
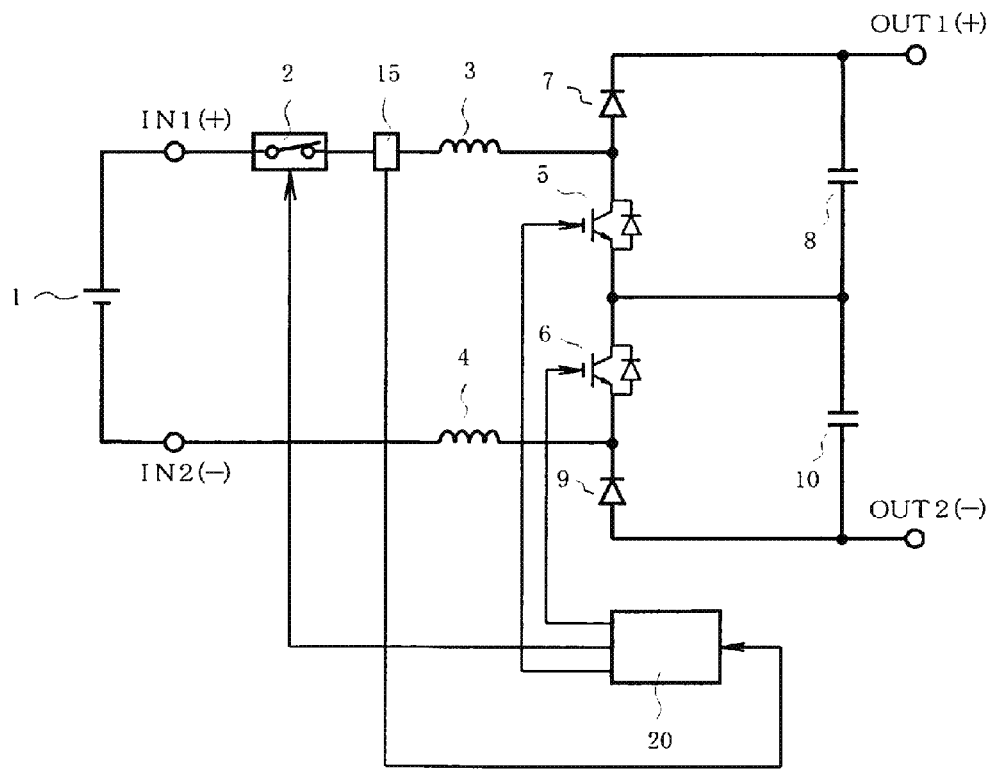
FIG. 11 is a diagram illustrating Embodiment 6 of the present invention.

Next, Embodiment 6 of the present invention, corresponding to aspect 10, will be described with reference to FIG. 11.

In Embodiment 6, a current detector 15 is connected in series to the reactor 3, and a current detection value outputted from the current detector 15 is inputted to the control circuit 20. Although the following will describe a case where the current detector 15 is connected in series to the reactor 3, a current detector may be connected to one or both of the reactors 3 and 4 and current detection values thereof may be inputted to the control circuit 20.

The control circuit 20 is configured to generate on/off signals for the switching elements 5 and 6 on the basis of the current detection value of the reactor 3 and generate open/close commands for the circuit breaker 2.

Here, a case where a short circuit fault has occurred in one of the switching elements 5 and 6 (here, the switching element 6) will be described. In this case, the conduction operations described in Embodiment 1 with reference to FIGS. 6A and 6B are repeated. As a result, a current flowing in the reactor 3 gradually increases, and a current much greater than that flowing during normal operations, or in other words, an overcurrent, flows.

The above example describes a case where a short circuit fault has occurred in the switching element 6, but in the case where a short circuit fault has occurred in the switching element 5, an overcurrent ultimately flows in the reactor 3 as a result of the on/off operations of the switching element 6 being repeated.

The control circuit 20 detects that an overcurrent is flowing in the reactor 3 on the basis of the current detection value of the reactor 3.

The control circuit 20 determines that a short circuit fault has occurred in the switching element 5 or 6 in the case where it has been detected that an overcurrent is flowing in the reactor 3.

Having determined that a short circuit fault has occurred in the switching element 5 or 6, the control circuit 20 prevents the voltage of the capacitor 8 or 10 from continuing to rise by supplying an on gate command to both the switching elements 5 and 6 before the circuit breaker 2 is opened.

Figure 12:
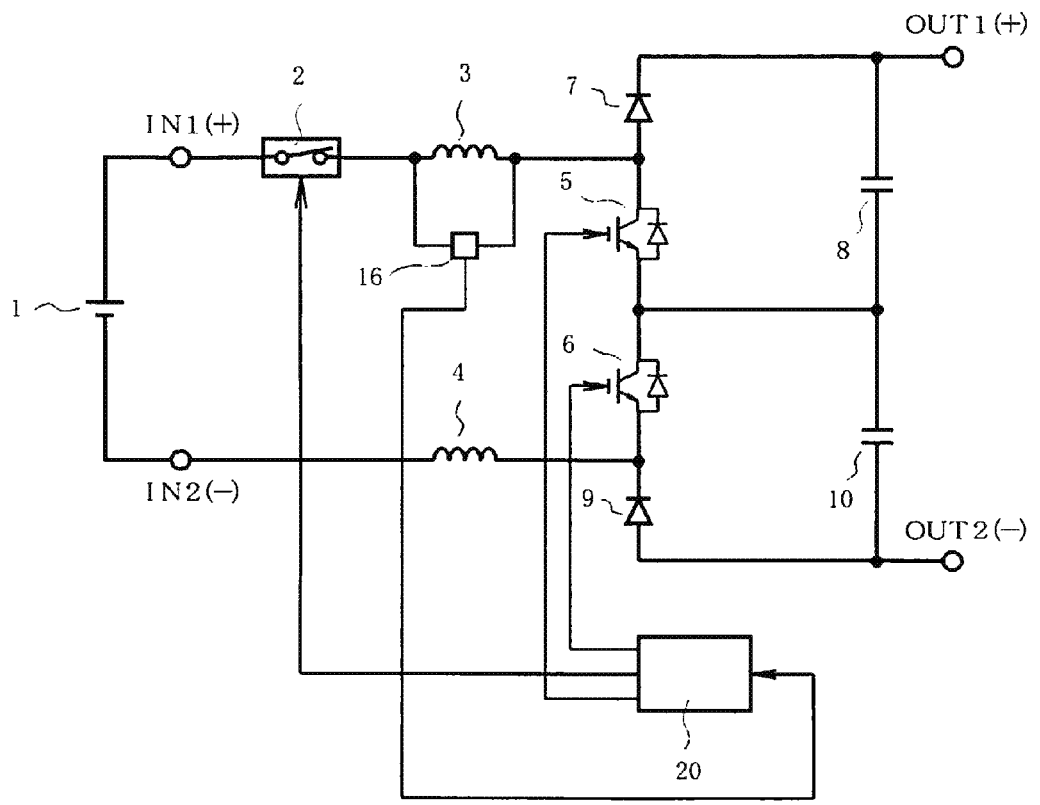
FIG. 12 is a diagram illustrating Embodiment 7 of the present invention.

Next, Embodiment 7 of the present invention, corresponding to aspect 11, will be described with reference to FIG. 12.

In Embodiment 7, a voltage detector 16 is connected in parallel to the reactor 3, and a voltage detection value outputted from the voltage detector 16 is inputted to the control circuit 20. Although the following will describe a case where the voltage detector 16 is connected in parallel to the reactor 3, a voltage detector may be connected to one or both of the reactors 3 and 4 and voltage detection values thereof may be inputted to the control circuit 20.

The control circuit 20 is configured to generate on/off signals for the switching elements 5 and 6 on the basis of the voltage detection value of the reactor 3 and generate open/close commands for the circuit breaker 2.

Here, a case where a short circuit fault has occurred in one of the switching elements 5 and 6 (here, the switching element 6) will be described. In this case, the conduction operations described in Embodiment 1 with reference to FIGS. 6A and 6B are repeated. As a result, a current flowing in the reactor 3 gradually increases, and a current much greater than that flowing during normal operations flows. Accordingly, the voltage between both ends of the reactor 3 becomes much greater than during conduction during normal operations. Alternatively, the voltage originally to be handled by the faulty switching element 6 is handled by the reactor 3 in a period where a gate command to the switching element 5 is on and a gate command to the switching element 6 is off. Accordingly, the voltage between both ends of the reactor 3 becomes much greater than the value in the stated period during normal operations.

As described above, the voltage between both ends of the reactor 3 becomes much higher than the voltage during normal operations in the case where a short circuit fault has occurred in the switching element 5 as well.

Accordingly, the control circuit 20 detects that an overcurrent is flowing in the reactor 3 on the basis of the voltage detection value at both ends of the reactor 3.

The control circuit 20 determines that a short circuit fault has occurred in the switching element 5 or 6 in the case where it has been detected that an overcurrent is flowing in the reactor 3.

Having determined that a short circuit fault has occurred in the switching element 5 or 6, the control circuit 20 can prevent the voltage of the capacitor 8 or 10 from continuing to rise by supplying an on gate command to both the switching elements 5 and 6 before the circuit breaker 2 is opened.

Figure 13:
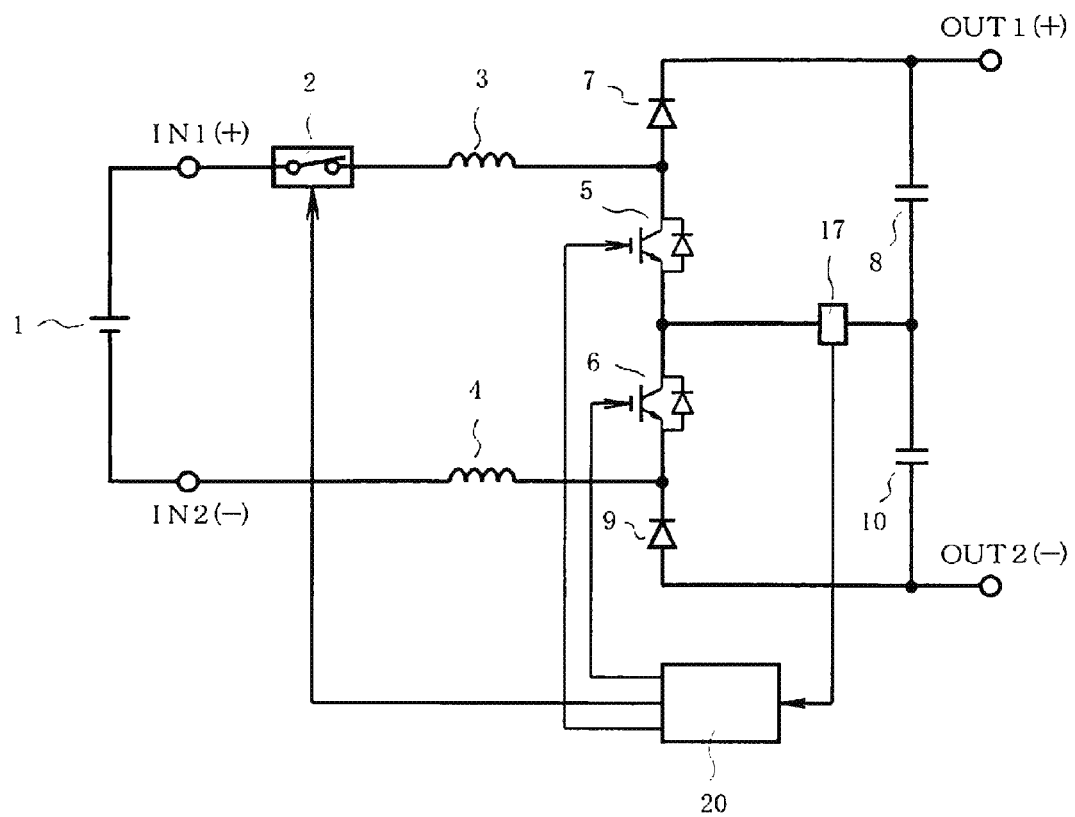
FIG. 13 is a diagram illustrating Embodiment 8 of the present invention.

Next, Embodiment 8 of the present invention, corresponding to aspect 12, will be described with reference to FIG. 13.

In Embodiment 8, a current detector 17 is connected to a line connecting a node between the switching elements 5 and 6 and a node between the capacitors 8 and 10 (this will be called an intermediate line hereinafter), and a current detection value outputted from the current detector 17 is inputted to the control circuit 20. The control circuit 20 is configured to generate on/off signals for the switching elements 5 and 6 on the basis of the current detection value of the intermediate line and generate open/close commands for the circuit breaker 2.

Here, a case where a short circuit fault has occurred in one of the switching elements 5 and 6 (here, the switching element 6) will be described. In this case, the conduction operations described in Embodiment 1 with reference to FIGS. 6A and 6B are repeated. As a result, a current flowing in the intermediate line gradually increases, and a current much greater than that flowing during normal operations, or in other words, an overcurrent, flows.

The above example describes a case where a short circuit fault has occurred in the switching element 6, but in the case where a short circuit fault has occurred in the switching element 5, an overcurrent ultimately flows in the intermediate line as a result of the on/off operations of the switching element 6 being repeated.

The control circuit 20 detects that an overcurrent is flowing in the intermediate line on the basis of the current detection value from the current detector 17.

The control circuit 20 determines that a short circuit fault has occurred in the switching element 5 or 6 in the case where it has been detected that an overcurrent is flowing in the intermediate line.

Having determined that a short circuit fault has occurred in the switching element 5 or 6, the control circuit 20 prevents the voltage of the capacitor 8 or 10 from continuing to rise by supplying an on gate command to both the switching elements 5 and 6 before the circuit breaker 2 is opened.

Figure 14:
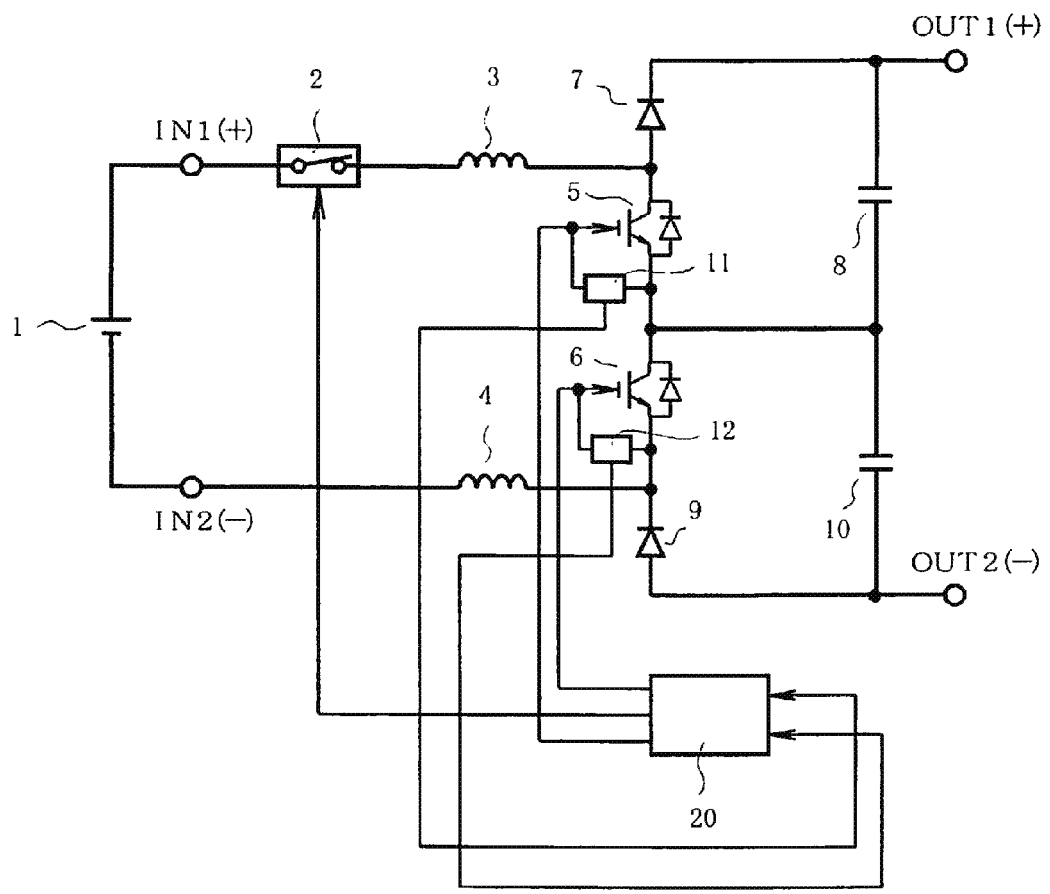
FIG. 14 is a diagram illustrating Embodiment 9 of the present invention.

Next, Embodiment 9 of the present invention, corresponding to aspect 13, will be described with reference to FIG. 14.

In the present embodiment, the voltage detectors 11 and 12 are connected between a gate (a base serving as a control electrode in a bipolar transistor; the following descriptions will be given assuming a gate) serving as a control electrode and an emitter of the switching elements 5 and 6, respectively, and the voltage detection values thereof are inputted to the control circuit 20. Note that the voltage detectors 11 and 12 may be connected between the gate and collector of the switching elements 5 and 6, respectively, as long as long as the gate voltages thereof can be detected without impediment.

The control circuit 20 is configured to generate on/off signals for the switching elements 5 and 6 on the basis of the voltage detection values of the gates of the switching elements 5 and 6 and generate open/close commands for the circuit breaker 2.

Here, a case where the gate of one of the switching elements 5 and 6 (here, the switching element 6) is continually short circuited or a gate potential is continually at a high level will be described. In this case, in the present embodiment, the control circuit 20 detects that the gate of the switching element 6 is continually short circuited or the gate potential is continually at a high level on the basis of the voltage detection values of the gates.

The control circuit 20 determines that a short circuit fault has occurred in the switching element 6 in the case where it has been detected that the gate of the switching element 6 is continually short circuited or the gate potential is continually at a high level.

Having determined that a short circuit fault has occurred in the switching element 6, the control circuit 20 prevents the voltage of the capacitor 8 from continuing to rise by turning the switching element 5 on before the circuit breaker 2 is opened.

Note that the control circuit 20 determines that a short circuit fault has occurred in the switching element 5 in the case where it has been detected that the gate of the switching element 5 is continually short circuited or the gate potential is continually at a high level.

Having determined that a short circuit fault has occurred in the switching element 5, the control circuit 20 prevents the voltage of the capacitor 10 from continuing to rise by turning the switching element 6 on before the circuit breaker 2 is opened, on the basis of the voltage detection values of the gates.

Meanwhile, in the case where it is determined that the switching element 5 or a short circuit fault has occurred in the switching element 6, the control circuit 20 may supply an on gate command to both the switching elements 5 and 6, and the same effects can be achieved in such a case as well.

Figure 15:
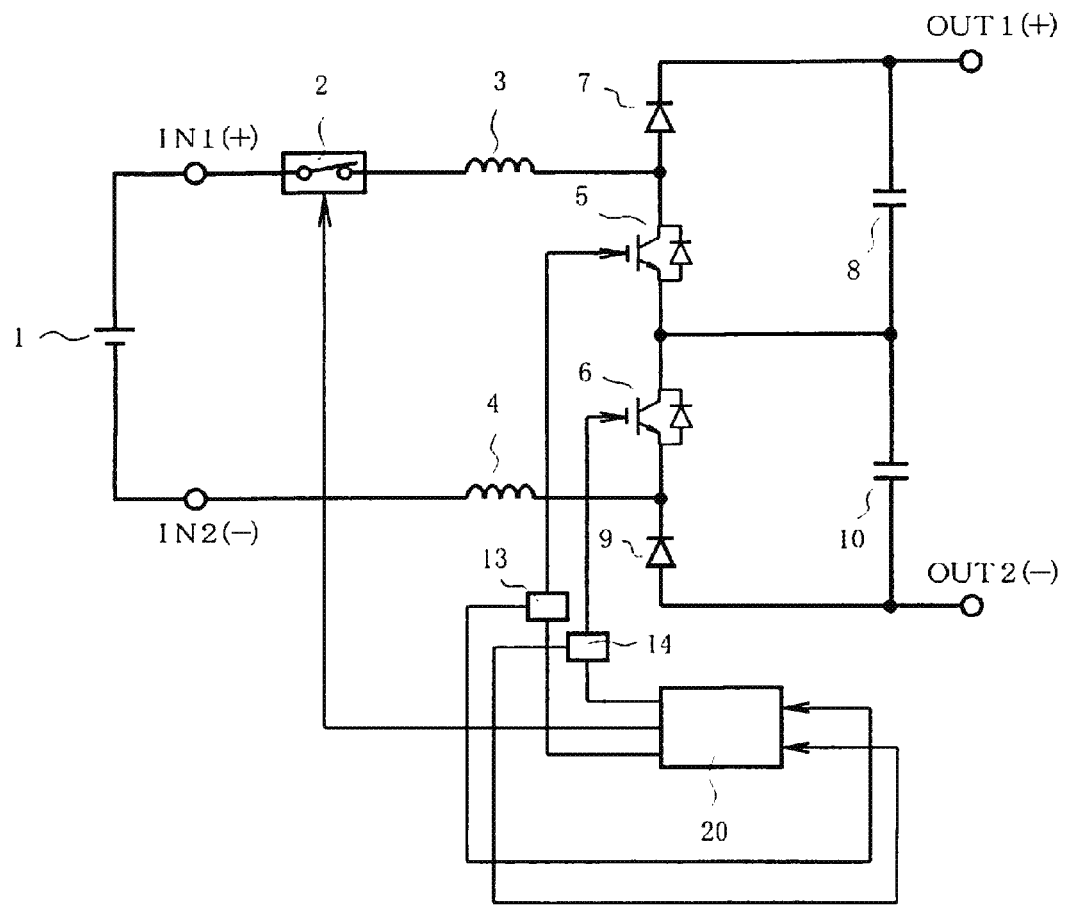
FIG. 15 is a diagram illustrating Embodiment 10 of the present invention.

Next, Embodiment 10 of the present invention, corresponding to aspect 14, will be described with reference to FIG. 15.

In the present embodiment, the current detectors 13 and 14 are connected to the gate (a base serving as a control electrode in a bipolar transistor; the following descriptions will be given assuming a gate) serving as a control electrode of the switching elements 5 and 6, respectively, and the current detection values thereof are inputted to the control circuit 20.

The control circuit 20 is configured to generate on/off signals for the switching elements 5 and 6 on the basis of the current detection values of the gates of the switching elements 5 and 6 and generate open/close commands for the circuit breaker 2.

Here, a case where a gate current in one of the switching elements 5 and 6 (here, the switching element 6) is an overcurrent or is continually flowing will be described. In this case, in the present embodiment, the control circuit 20 detects that the gate current in the switching element 6 is an overcurrent or is continually flowing on the basis of the current detection values of the gates.

The control circuit 20 determines that a short circuit fault has occurred in the switching element 6 in the case where it has been detected that gate current in the switching element 6 is an overcurrent or is continually flowing.

Having determined that a short circuit fault has occurred in the switching element 6, the control circuit 20 prevents the voltage of the capacitor 8 from continuing to rise by turning the switching element 5 on before the circuit breaker 2 is opened.

Note that the control circuit 20 determines that a short circuit fault has occurred in the switching element 5 in the case where it has been detected that gate current in the switching element 5 is an overcurrent or is continually flowing.

Having determined that a short circuit fault has occurred in the switching element 5, the control circuit 20 prevents the voltage of the capacitor 10 from continuing to rise by turning the switching element 6 on before the circuit breaker 2 is opened.

Meanwhile, in the case where it is determined that the switching element 5 or a short circuit fault has occurred in the switching element 6, the control circuit 20 may supply an on gate command to both the switching elements 5 and 6, and the same effects can be achieved in such a case as well.

Figure 16:
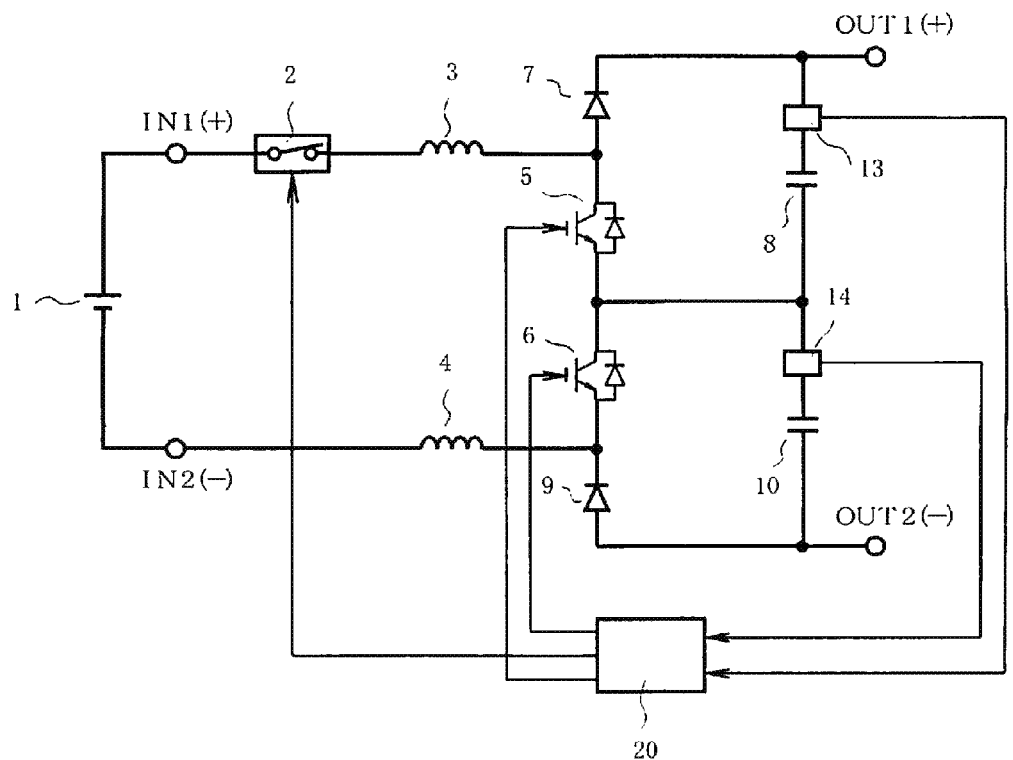
FIG. 16 is a diagram illustrating Embodiment 11 of the present invention.

Next, Embodiment 11 of the present invention, corresponding to aspect 15, will be described with reference to FIG. 16.

In Embodiment 11, the current detectors 13 and 14 are connected in series to the capacitors 8 and 10, respectively, and the current detection values outputted from the current detectors 13 and 14 are inputted to the control circuit 20. The control circuit 20 is configured to generate on/off signals for the switching elements 5 and 6 on the basis of the current detection values of the capacitors 8 and 10 and generate open/close commands for the circuit breaker 2.

Here, a case where a short circuit fault has occurred in one of the switching elements 5 and 6 (here, the switching element 6) will be described. In the case where a short circuit fault occurs in the switching element 6, a current much greater than that flowing during normal operations, or in other words, an overcurrent, flows in the capacitor 8. Specifically, the overcurrent flows in a steady period, or in other words, a period that follows the passage of a transitional period resulting from the switching of the switching element 6 but that comes before the start of the next switching.

The control circuit 20 detects that an overcurrent is flowing in the capacitor 8 on the basis of the current detection value of the capacitor 8 outputted from the current detector 13. The control circuit 20 determines that a short circuit fault has occurred in the switching element 6 in the case where it has been detected that an overcurrent is flowing in the capacitor 8.

In the case where it has been determined that a short circuit fault has occurred in the switching element 6, the control circuit 20 prevents the voltage of the capacitor 8 from continuing to rise by turning the switching element 5 on before the circuit breaker 2 is opened.

Although the above describes a case where a short circuit fault has occurred in the switching element 6 as an example, an overcurrent flows in the capacitor 10 in the case where a short circuit fault has occurred in the switching element 5 as well. The control circuit 20 determines that a short circuit fault has occurred in the switching element 5 in the case where it has been detected that an overcurrent is flowing in the capacitor 10 on the basis of the current detection value of the capacitor 10 outputted from the current detector 14.

Having determined that a short circuit fault has occurred in the switching element 5, the control circuit 20 can prevent the voltage of the capacitor 10 from continuing to rise by turning the switching element 6 on before the circuit breaker 2 is opened.

In the case where it is determined that the switching element 5 or a short circuit fault has occurred in the switching element 6, the control circuit 20 may supply an on gate command to both the switching elements 5 and 6, and the same effects can be achieved in such a case as well.

As mentioned in Embodiment 1, a delay time from when the control circuit outputs an open command to the circuit breaker to when the circuit breaker actually opens is generally longer than a delay time from when an on gate command is outputted to a switching element to when the switching element actually turns on. Accordingly, it is necessary for the control circuit according to the present invention to output the on gate command so that a prescribed switching element completes its on operations before the circuit breaker is actually opened, regardless of the timing at which the open command for the circuit breaker is outputted.

In other words, the fundamental concept of the present invention is suppressing a rise in the voltage in a capacitor and preventing a low-breakdown voltage switching element, a low-breakdown voltage capacitor, or the like from being damaged by turning on a prescribed switching element before a protective operation of opening the circuit breaker is carried out, when it is determined a short circuit fault has occurred in a switching element.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A DC-DC converter, comprising:
   a switching element series circuit in which first and second switching elements are connected in series and connected to respective ends of a DC power source;
   a reactor inserted between the DC power source and the switching element series circuit;
   a capacitor series circuit in which first and second capacitors are connected in series;
   first and second diodes, the first diode being connected between one end of the switching element series circuit and one end of the capacitor series circuit, the second diode being connected between the other end of the switching element series circuit and the other end of the capacitor series circuit;
   a control circuit that performs ON/OFF control of the first and second switching elements; and
   a detector that detects an anomaly in said switching element series circuit,
   wherein a node between the first and second switching elements is connected to a node between the first and second capacitors,
   wherein the control circuit turns the first and second switching elements ON and OFF via a chopper operation so as to step up a voltage of the DC power source and cause the stepped up voltage to be outputted from both ends of the capacitor series circuit, and
   wherein the control circuit determines that a short circuit has occurred in the switching element series circuit when the detector detects said anomaly, and when that determination is made, the control circuit transmits an overriding ON command to one of the first and second switching elements that is determined to be free from the short circuit if such determination is made, or to both of the first and second switching elements regardless of whether a determination of which of the first and second switching elements is free from the short circuit is made, thereby overriding and terminating said chopper operation.

2. The DC-DC converter according to claim 1, further comprising:
   a circuit breaker between the DC power source and the switching element series circuit,
   wherein, when the detector detects the short circuit in the switching element series circuit, the control circuit transmits an open command to the circuit breaker when transmitting said overriding ON command, and
   wherein the circuit breaker opens in response to said open command after the corresponding first and/or second switching element has turned on in response to said overriding ON command.

3. The DC-DC converter according to claim 1,
wherein the detector includes first and second voltage detectors that detect voltages across the first and second capacitors, respectively, and
wherein the control circuit determines that the short circuit has occurred in the second switching element when the detector detects an overvoltage across the first capacitor, and determines that the short circuit has occurred in the first switching element when the detector detects an overvoltage across the second capacitor.

4. The DC-DC converter according to claim 1,
wherein the detector includes first and second voltage detectors that detect voltages across the first and second capacitors, respectively,
wherein the detector determines that the short circuit has occurred in the second switching element when the detector detects that a voltage across the first capacitor is higher than a voltage across the second capacitor and that a deviation of greater than or equal to a prescribed value has arisen between the voltages of the two capacitors, and
wherein the control circuit determines that the short circuit has occurred in the first switching element when the detector detects that a voltage across the second capacitor is higher than a voltage across the first capacitor and that a deviation of greater than or equal to a prescribed value has arisen between the voltages of the two capacitors.

5. The DC-DC converter according to claim 1,
wherein the detector includes first and second current detectors that detect currents in the first and second switching elements, respectively, and
wherein the control circuit determines that the short circuit has occurred in the first switching element when the detector detects that an overcurrent is flowing in the first switching element, and determines that the short circuit has occurred in the second switching element when the detector detects that an overcurrent is flowing in the second switching element.

6. The DC-DC converter according to claim 1,
wherein the detector includes first and second voltage detectors that detect voltages across the first and second switching elements, respectively,
wherein the control circuit determines that the short circuit has occurred in the first switching element when the detector detects that a voltage between both ends of the first switching element is greater than or equal to a prescribed value or less than or equal to a prescribed value in a period in said chopper operation during which an ON command is being supplied to the first switching element, and
wherein the control circuit determines that the short circuit has occurred in the second switching element when the detector detects that a voltage between both ends of the second switching element is greater than or equal to a prescribed value or less than or equal to a prescribed value in a period in said chopper operation during which an ON command is being supplied to the second switching element.

7. The DC-DC converter according to claim 1,
wherein the detector includes first and second voltage detectors that detect voltages across the first and second switching elements, respectively,
wherein the control circuit determines that the short circuit has occurred in the first switching element when the detector detects that a voltage between both ends of the first switching element is less than or equal to a prescribed value in a period in said chopper operation during which an OFF command is being supplied to the first switching element, and
wherein the control circuit determines that the short circuit has occurred in the second switching element when the detector detects that a voltage between both ends of the second switching element is less than or equal to a prescribed value in a period in said chopper operation during which an OFF command is being supplied to the second switching element.

8. The DC-DC converter according to claim 1,
wherein the detector includes first and second current detectors that detect currents in the first and second diodes, respectively, and
wherein the control circuit determines that the short circuit has occurred in the second switching element when the detector detects that an overcurrent is flowing in the first diode, and determines that the short circuit has occurred in the first switching element when the detector detects that an overcurrent is flowing in the second diode.

9. The DC-DC converter according to claim 1,
wherein the detector includes first and second voltage detectors that detect voltages across the first and second diodes, respectively,
wherein the control circuit determines that the short circuit has occurred in the second switching element when the detector detects that a voltage between both ends of the first diode is greater than or equal to a prescribed value in a period in the chopper operation during which an OFF command is being supplied to the first switching element, and
wherein the control circuit determines that the short circuit has occurred in the first switching element when the detector detects that a voltage between both ends of the second diode is greater than or equal to a prescribed value in a period in the chopper operation during which an OFF command is being supplied to the second switching element.

10. The DC-DC converter according to claim 1,
wherein said detector is a current detector that detects a current in the reactor, and
wherein the control circuit determines that the short circuit has occurred in at least one of the first and second switching elements when the current detector detects that an overcurrent is flowing in the reactor.

11. The DC-DC converter according to claim 1,
wherein said detector is a voltage detector that detects a voltage across the reactor, and
wherein the control circuit determines that the short circuit has occurred in at least one of the first and second switching elements when the voltage detector detects that a voltage between both ends of the reactor is greater than or equal to a prescribed value.

12. The DC-DC converter according to claim 1,
wherein the detector is a current detector that detects a current in a line connecting said node between the first and second switching elements to said node between the first and second capacitors, and
wherein the control circuit determines that the short circuit has occurred in at least one of the first and second switching elements when the current detector detects that an overcurrent is flowing in said line.

13. The DC-DC converter according to claim 1,
wherein the control circuit determines that the short circuit has occurred in the first switching element when the detector detects that a control electrode of the first switching element is continually short circuited or that a potential of the control electrode is continually at a high level, and wherein the control circuit determines that the short circuit has occurred in the second switching element when the detector detects that a control electrode of the second switching element is continually short circuited or that a potential of the control electrode is continually at a high level.

14. The DC-DC converter according to claim 1, wherein the control circuit determines that the short circuit has occurred in the first switching element when the detector detects that a current flowing in a control electrode of the first switching element is an overcurrent or is continually flowing, and wherein the control circuit determines that the short circuit has occurred in the second switching element when the detector detects that a current flowing in a control electrode of the second switching element is an overcurrent or is continually flowing.

15. The DC-DC converter according to claim 1, wherein the detector includes first and second current detectors that detect currents in the first and second capacitors, respectively, wherein the control circuit determines that the short circuit has occurred in the second switching element when the detector detects that an overcurrent is flowing in the first capacitor, and determines that the short circuit has occurred in the first switching element when the detector detects that an overcurrent is flowing in the second capacitor.

16. The DC-DC converter according to claim 1, wherein the control circuit outputs a warning when determining that the short circuit has occurred in said switching element series circuit.

* * * * *